US012559821B2

(12) United States Patent
Wu et al.

(10) Patent No.: US 12,559,821 B2
(45) Date of Patent: Feb. 24, 2026

(54) METHOD FOR NUMERICAL SIMULATION OF REACTIVE TRANSPORT DURING CO2+O2 IN-SITU LEACHING OF URANIUM AT SANDSTONE-TYPE URANIUM DEPOSIT

(71) Applicants: Nanjing University, Nanjing (CN); Hohai University, Nanjing (CN)

(72) Inventors: Jianfeng Wu, Nanjing (CN); Jichun Wu, Nanjing (CN); Wenjie Qiu, Nanjing (CN); Yun Yang, Nanjing (CN); Zhengbang Liu, Nanjing (CN); Haicheng Weng, Nanjing (CN); Hongxing Li, Nanjing (CN); Shuangmin Liu, Nanjing (CN)

(73) Assignees: Nanjing University, Nanjing (CN); Hohai University, Nanjing (CN)

( * ) Notice: Subject to any disclaimer, the term of this patent is extended or adjusted under 35 U.S.C. 154(b) by 1376 days.

(21) Appl. No.: 17/531,300

(22) Filed: Nov. 19, 2021

(65) Prior Publication Data

US 2022/0290274 A1    Sep. 15, 2022

(30) Foreign Application Priority Data

Mar. 10, 2021    (CN) .......................... 202110260513.6

(51) Int. Cl.
*C22B 60/02*        (2006.01)
*G01V 1/30*         (2006.01)
(52) U.S. Cl.
CPC .......... *C22B 60/0226* (2013.01); *G01V 1/306* (2013.01)

(58) Field of Classification Search
CPC ............ C22B 60/0226; C22B 60/0265; C22B 60/0221; C22B 3/04; G01V 1/306; G01V 9/007; G01V 99/00; G06F 30/28; G06F 2111/10; G06F 2113/08; G06F 2119/08; G06F 2119/14
See application file for complete search history.

(56) References Cited

U.S. PATENT DOCUMENTS 12,168,813 B2 *  12/2024  Li .............................. C22B 3/02
2017/0341942 A1 *  11/2017  Harper, Jr. ................ F01K 7/16
2022/0011287 A1 *  1/2022  Marchais ............. G01N 23/083

* cited by examiner

*Primary Examiner* — Hoang M Nguyen
(74) *Attorney, Agent, or Firm* — Barclay Damon LLP

(57) ABSTRACT

The present disclosure provides a method for numerical simulation of reactive transport during $CO_2+O_2$ in-situ leaching of uranium at a sandstone-type uranium deposit. Unlike the traditional method for numerical simulation of solute transport during in-situ leaching of uranium with consideration of only convection and diffusion, the method permits establishment of a multi-field coupled reactive solute transport model to simulate the dynamic leaching process of a sandstone-type uranium deposit in Northern China. The method provided in the present disclosure includes: creating a thermodynamic database suitable for $CO_2+O_2$ leaching of a sandstone-type uranium deposit in Northern China, and with consideration of the dynamic reaction process of uranium dissolution under combined action of oxygen $O_2$ (aq) and bicarbonate $HCO_3^-$, performing numerical simulation of reactive transport during $CO_2+O_2$ in-situ leaching of uranium using a TOUGHREACT simulation technology framework.

10 Claims, 6 Drawing Sheets

METHOD FOR NUMERICAL SIMULATION OF REACTIVE TRANSPORT DURING CO₂+O₂ IN-SITU LEACHING OF URANIUM AT SANDSTONE-TYPE URANIUM DEPOSIT

CROSS REFERENCE TO RELATED APPLICATION(S)

This patent application claims the benefit and priority of Chinese Patent Application No. 202110260513.6 filed on Mar. 10, 2021, the disclosure of which is incorporated by reference herein in its entirety as part of the present application.

TECHNICAL FIELD

The present disclosure relates to a method for numerical simulation of reactive transport during $CO_2+O_2$ in-situ leaching of uranium at a sandstone-type uranium deposit and belongs to the fields of hydrology and water resources.

BACKGROUND ART

Uranium resources, as important raw materials for use in nuclear military industry and nuclear power, are compared to the "foodstuff" for the nuclear industry. In-situ leaching is a new global uranium mining method that incorporates mining, milling, and hydrometallurgy. Uranium production by in-situ leaching is anticipated to account for more than 90% of natural uranium production in China. The technique of $CO_2+O_2$ in-situ leaching of uranium can be representative of the third generation uranium mining and milling technology. This technique can be used to help solve a series of problems such as low-permeability, high-carbonate, hyper-salinity sandstone-type uranium deposits having low volume of pumped and injected fluids, long leaching period and easy blockage of ore beds. Thus, large-scale industrial applications of $CO_2+O_2$ neutral in-situ leaching uranium technology have been realized.

However, in practical production, there are few systematic studies about prediction and precision control techniques for dynamics process of in-situ leaching well fields by numerical simulation technique. The key scientific problem of in-situ leaching of uranium is to study the hydrodynamics characteristics and the process of reactive solute transport in a leaching system. In-situ leaching of uranium, as a complex coupling process of fluid transport and chemical reactions between leaching solution and uranium ores, involves an extremely complex nonlinear reactive solute transport system, including a multi-field coupling process of seepage dynamic field in rock pores, solute dispersion field in low-permeability heterogeneous media, and reactive chemical dynamic field created by water-rock interaction between the leaching solution and rock minerals during $CO_2+O_2$ in-situ leaching of uranium.

The key technical means to accurately describe the dynamic leaching process in in-situ leaching of uranium by research on the complex coupling process of fluid transport and geochemical reactions during $CO_2+O_2$ in-situ leaching of uranium and three-dimensional (3D) modeling of groundwater flow and reactive solute transport are also the basis of digital in-situ uranium leaching technology.

SUMMARY

In view of the above-mentioned defects of the prior art, an objective of the present disclosure is to provide a method for numerical simulation of reactive transport during $CO_2+O_2$ in-situ leaching of uranium at a sandstone-type uranium deposit. According to the method, a thermodynamic database suitable for $CO_2+O_2$ leaching of a sandstone-type uranium deposit in Northern China is created first and then applied to the simulation of the complex multi-field coupled nonlinear leaching system of seepage-diffusion-chemical reactions during in-situ leaching of uranium with consideration of the dynamic reaction process of uranium dissolution under combined action of $O_2$ (aq) and bicarbonate $HCO_3^-$. This method enables accurate simulation and dynamic control of the process of $CO_2+O_2$ in-situ leaching of uranium by taking the complexity of an independent process into account and solving a coupling relationship of different processes.

The present disclosure adopts the following technical solutions to solve the above-mentioned technical problems. A method for numerical simulation of reactive transport during $CO_2+O_2$ in-situ leaching of uranium at a sandstone-type uranium deposit includes the following steps:

(1) collecting basic data of a mining area of the sandstone-type uranium deposit, including relative plane positions of injection and production wells in the mining area, a distance between the injection and production wells, injection and production rates, groundwater level monitoring data, and hydro-chemical analysis data of leaching solution and leachate;

(2) constructing a hydrodynamic model of $CO_2+O_2$ in-situ leaching of uranium based on the basic data collected in step (1) in combination with hydrogeological conditions of the mining area including the type, lithology and thickness of an ore-bearing aquifer, the depth of a groundwater level, the depth and thickness of an ore body, the condition of groundwater recharge based on the fundamental principle of conservation of mass and energy, and Darcy's law;

(3) determining initial conditions, boundary conditions, hydraulic parameters, and a source-sink term of the hydrodynamic model, and performing spatial mesh dissection and temporal discretization;

(4) solving the hydrodynamic model to obtain a distribution of temporal and spatial flow velocity vectors sand a pressure distribution within a simulated domain;

(5) establishing a reactive solute transport model of $CO_2+O_2$ in-situ leaching of uranium based on the results of the hydrodynamic model in step (4) according to processes of component solute transport and chemical reactions in a system of in-situ leaching of uranium;

(6) determining a network of geochemical reactions and processes of equilibrium reactions and dynamic reactions of the reactive solute transport model;

(7) determining initial concentrations of simulated components in the reactive solute transport model, the composition of minerals involved in simulation, minerals produced by reactions and volume fractions thereof, and parameters for calculation of reaction dynamic rates of the minerals involved in simulation; and (8) solving the reactive solute transport model to obtain a trends of variation in leaching concentration of dissolved uranium U (VI), pH and mineral content in the system of in-situ leaching of uranium, thereby completing the numerical simulation of reactive transport during $CO_2+O_2$ in-situ leaching of uranium.

Further, the hydrodynamic model may be resolved by using TOUGHREACT-V3/EOS9 module of a multi-component and multi-process reactive solute transport simulation program TOUGHREACT in step (4).

Further, the reactive solute transport model of $CO_2+O_2$ in-situ leaching of uranium in step (5) is described by using the following mass conservation equation for chemical components:

$$\frac{\partial(\phi c_i)}{\partial t} = -\nabla(\rho c_i v) + \nabla(D_e \nabla c_i) + Q + \phi R \quad (1)$$

where the term on the left of the equation denotes a rate of mass change of chemical component i in a reaction system, and the term on the right denotes the contributions of convection and diffusion of the chemical component, a source-sink term, and dissolution and precipitation of mineral components to the mass change of the chemical component; $c_i$ is a concentration of the chemical component i involved in simulation in the reactive solute transport model, $D_e$ is an effective diffusion coefficient, Q is the source-sink term in the reaction system, R is a chemical reaction rate, $\phi$ is a porosity, $\rho$ is a fluid density, $v$ is a hydrodynamic velocity, and $\nabla$ is a gradient operator.

Further, the determining a network of chemical reactions and processes of equilibrium reactions and dynamic reactions of the reactive solute transport model in step (6) may include:

① determining chemical reactions during $CO_2+O_2$ in-situ leaching of uranium, where the mechanism of action of $CO_2+O_2$ in-situ leaching of uranium is as follows: a leaching solution prepared with $CO_2$ and $O_2$ is injected into an ore bed, such that $O_2$ oxidizes quadrivalent uranium U (IV) into hexavalent uranium U (VI) which is dissolved in the leaching solution, and $CO_2$ is dissolved in water to form carbonic acid which is then decomposed into bicarbonate $HCO_3^-$ to serve as coordination ion for complexing of uranium and to regulate pH, thereby reducing chemical blockage of pores in the ore bed; under a neutral condition (pH ranging from 7 to 8), uranyl ion $UO_2^{2+}$ is prone to complexing with the bicarbonate $HCO_3^-$ to form uranyl carbonate which is present in the form of $$UO_2(CO_3)_2^{2-} \text{ and } UO_2(CO_3)_3^{4-};$$

and the leaching of uranium involves the following chemical reactions:

$$CO_2(aq)+H_2O=H^++HCO_3^- \quad (2)$$

$$2UO_2(s)+O_2=2UO_3(s) \quad (3)$$

$$UO_3(s)+2HCO_3^-=UO_2(CO_3)_2^{2-}+H_2O \quad (4)$$

$$UO_3(s)+CO_3^{2-}+2HCO_3^-=UO_2(CO_3)_3^{4-}+H_2O \quad (5)$$

② creating a thermodynamic database of equilibrium reactions: adding the produced species of the dissolved uranium U (VI) and other components involved in simulation in the system of $CO_2+O_2$ in-situ leaching of uranium and corresponding equilibrium constant data to create a thermodynamic database of the $CO_2+O_2$ in-situ leaching of uranium for calculation of component forms of desired species and for use in numerical simulation of reactive solute transport; and ③ establishing a rate equation for dynamic reactions: where a reaction rate is a parameter for quantitative description of a chemical reaction in dissolution and precipitation of a mineral, determining a rate equation for reactions involved in dissolution and precipitation of minerals based on the transition state theory (TST) of chemical reactions.

Further, in the step ② of creating a thermodynamic database of equilibrium reactions, an aqueous solution component and formed species in the system of in-situ leaching of uranium may be defined first. For example, with uranyl ion ($UO_2^{2+}$) as the component, the formed species include $$UO_2OH^+, UO_2(CO_3)_2^{2-} \text{ and } UO(CO_3)_3^{4-}.$$

A formation reaction process and a thermodynamic equilibrium constant of the formed species may then be determined, and a data combination in a specific format may be formed with the component, the formed species and thermodynamic equilibrium constant. Finally, thermodynamic database of equilibrium reactions may be created with data combinations of a plurality of components in the reaction solute transport model.

Further, in the step ④ of establishing a rate equation for dynamic reactions, the following reaction rate expression in the TOUGHREACT program may be used:

$$r = kA\left|1 - \left(\frac{Q}{K}\right)^{\theta}\right|^{\eta} \quad (6)$$

where r is a dissolution/precipitation reaction rate of a mineral ($mol/m^3 \cdot s$), k is a rate constant, ($mol/m^2 \cdot s$), A is a specific surface area of a mineral per kilogram of water($cm^2/g$); K is a chemical equilibrium constant (dimensionless), Q is an activity product (dimensionless) of an ion, and $\theta$ and $\eta$ are constants measured through experiments, which are positive values.

For the dynamic reaction process of uraninite in a sandstone-type uranium deposit, the rate constant k may be subject to a number of factors. For example, surface adsorption, surface exchange reaction, hydrogen ion activity (i.e., pH) in solution, and chemical components may play a role in catalyzing or inhibiting a reaction, thus affecting the reaction rate. Based on some laboratory experimental results, the dynamic reaction process of dissolution of uranium may be controlled by $O_2$ (aq) and bicarbonate $HCO_3^-$, such that a dissolution constant k thereof at 25° C. may be changed to:

$$k=k_1[H^+]^{0.37}[O_2(aq)]^{0.31}+k_2[HCO_3^-]^{0.35} \quad (8)$$

where k is the rate constant ($mol/m^2 \cdot s$), and $k_1$ and $k_2$ are rate constants ($mol/m^2 \cdot s$) with consideration of oxygen component $O_2$ (aq) and with consideration of bicarbonate ion ($HCO_3^-$), respectively; where 0.37, 0.31 and 0.35 are exponential terms of concentrations of chemical components $H^+$, $O_2$ (aq) and $HCO_3^-$; and $[H^+]$, $[O_2$ (aq)] and $[HCO_3^-]$ denote concentrations of $H^+$, $O_2$ (aq) and $HCO_3^-$, respectively.

Further, the reactive solute transport model in step (8) may be resolved by using a sequential iteration algorithm (SIA) in the TOUGHREACT program.

Compared with the prior art, the present disclosure has the following advantages:

The method can realize the coupling process of hydrody-namic-chemical reactions during $CO_2+O_2$ in-situ leaching of uranium, improve the numerical simulation performance of reactive transport during $CO_2+O_2$ in-situ leaching at a sandstone-type uranium deposit, permit accurate and dynamic control on in-situ leaching of uranium, and provide technical support for sustainable development of the sandstone-type uranium deposit.

DETAILED DESCRIPTION OF THE EMBODIMENTS

To explain the objectives, technical solutions, and advantages of the present disclosure more clearly, the technical solutions of the present disclosure will be described in more detail below with reference to the accompanying drawings.

EXAMPLE

The present disclosure provides a method for numerical simulation of reactive transport during $CO_2+O_2$ in-situ leaching of uranium at sandstone-type uranium deposit. The method includes the following steps: S1, collect basic data; S2, establish a hydrodynamic model in combination with hydrogeological conditions; S3, perform mesh generation, temporal discretization and basic setting of the model; S4, resolve the seepage flow model; S5, establish a reactive solute transport model; S6, determine the geochemical reaction network and reaction types; S7, perform basic setting of the reactive solute transport model; S8, resolve the reactive solute transport model. In examples of the present disclosure, a laboratory pressure column leaching test with $CO_2+O_2$ of a certain uranium deposit was conducted.

1) Conditions of $CO_2+O_2$ Pressure Column Leaching Test

Figure 1:
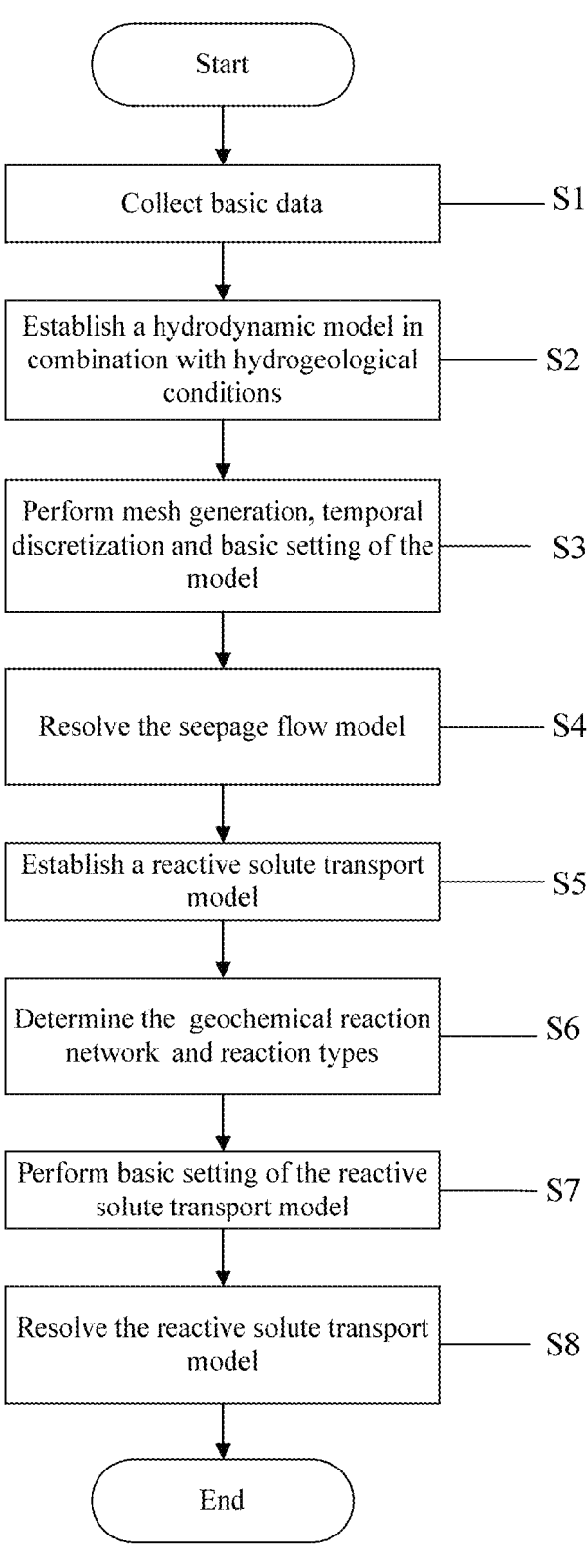
FIG. 1 is a flowchart of a method for numerical simulation of reactive transport during $CO_2+O_2$ in-situ leaching of uranium.
Figure 2:
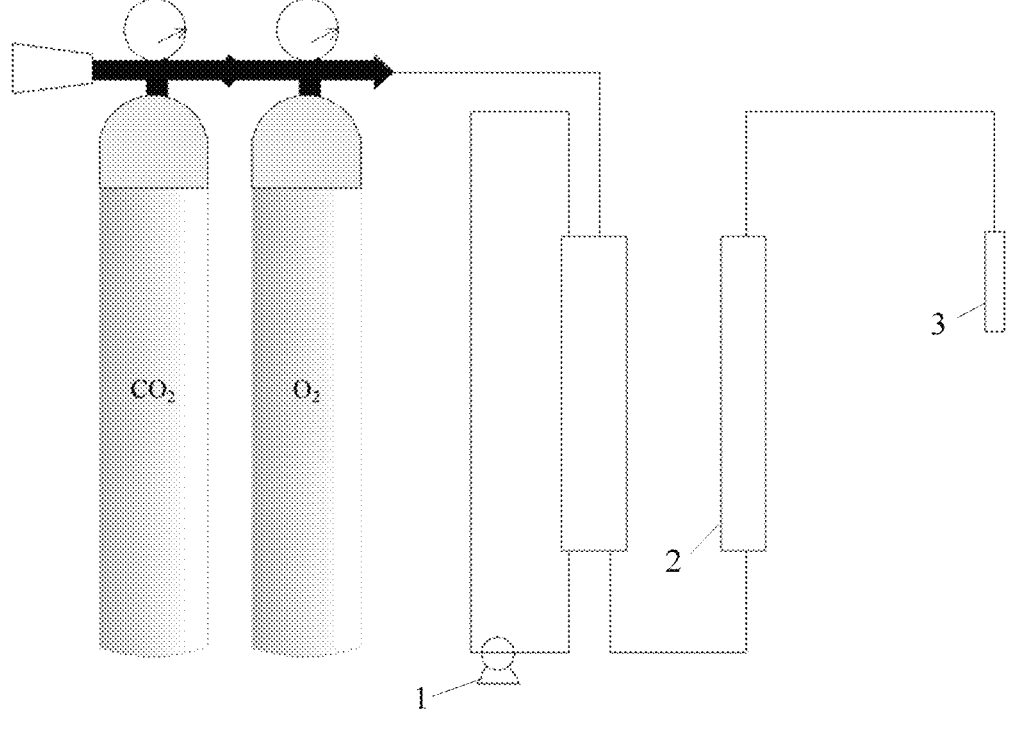
FIG. 2 is a schematic diagram of a $CO_2+O_2$ pressure column leaching test rig.
Figure 3:
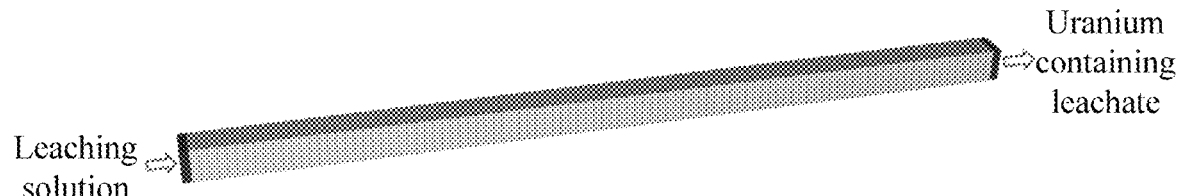
FIG. 3 is a diagram of a conceptual model of pressure column leaching with $CO_2+O_2$.

Generally, an appropriate pressure column leaching laboratory test with $CO_2+O_2$ would be conducted before the starting industrial in-situ leaching mining. Test simulation of leaching of uranium under pressure was performed to obtain a series of process parameters of in-situ leaching of uranium, providing reference for industrial mining design. A pressure column leaching test rig for simulation as shown in FIG. 1 was used, including compressed gas cylinders, a leaching column 2, a sampler 3, a solution circulating pump 1 and the like (see related documents for detailed descriptions). During the test, rock core ore samples collected during exploration were analyzed and identified first. A broken sandstone ore sample was placed into the leaching column of the pressure column leaching test rig, and then a prepared leaching solution containing carbon dioxide and oxygen was injected into the leaching column. An outlet valve was adjusted to control the flow velocity. A leachate was allowed to flow from the top of the leaching column to the sampler and sampled regularly for analysis of U, pH, Eh and other main ion components of the leachate.

2) Mineral Component Characteristics of Ores

According to analysis and identification results of the collected rock core ore samples, the ore-bearing rock mainly manifested as fine sandstone and medium sandstone, with less mineralized siltstone and mudstone. The quantitative analysis of minerals of the ore-bearing sandstone showed that main mineral components in ores were quartz (56.2-79.5%, with an average of 68.4%), K-feldspar (6.8-11.9%, with an average of 9.9%), albite (7.2-19.3%, with an average of 10.6%), and clay minerals (3.6-13.0%, with an average of 7.2%). Carbonate minerals in the ore-bearing sandstone were dolomite as a primary component and calcite as a secondary component.

3) Conceptual Model of Laboratory Pressure Column Leaching with $CO_2+O_2$

Figure 4:
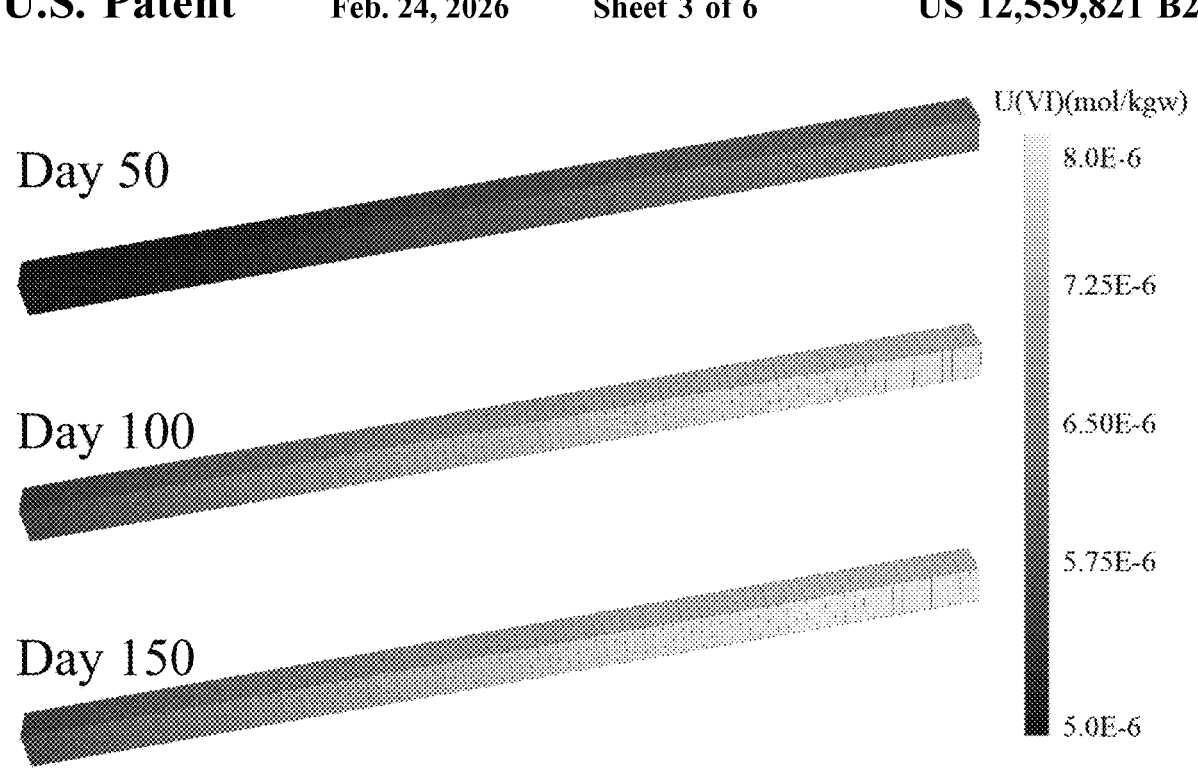
FIG. 4 is a diagram showing a trend of variation in concentration of dissolved uranium U (VI) with time in a leaching column during a simulated column leaching test.
Figure 5:
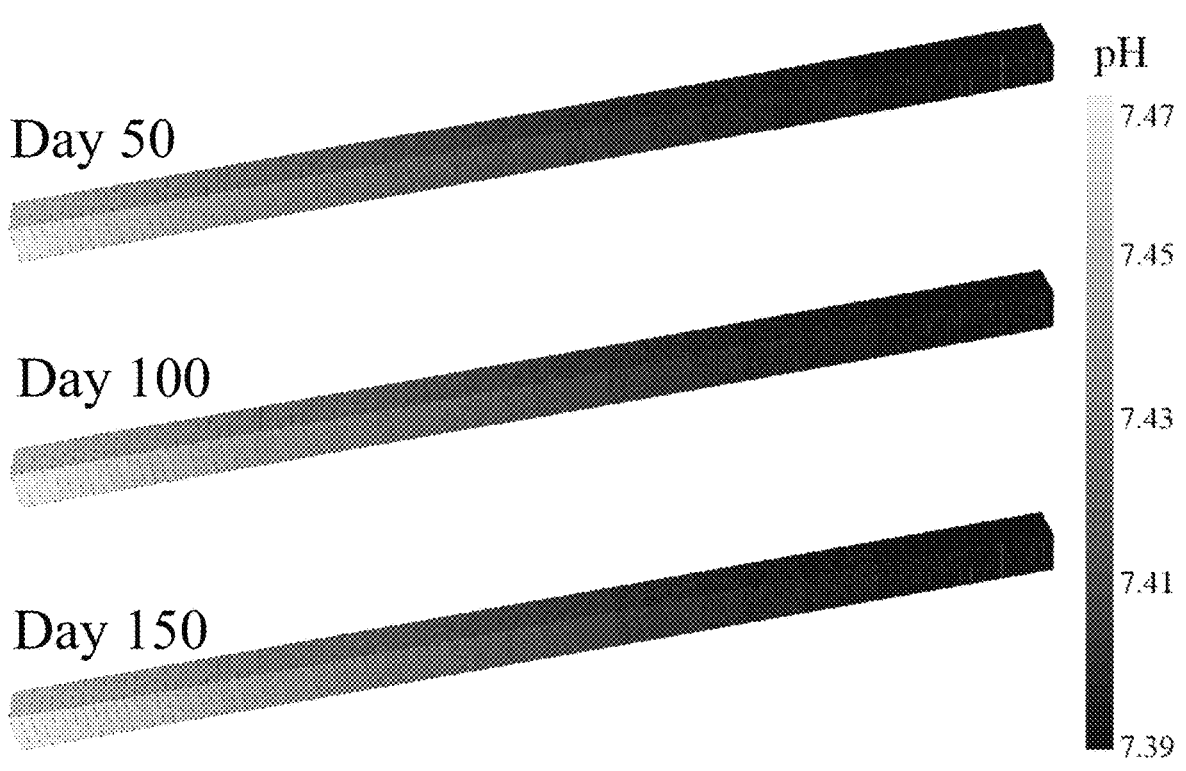
FIG. 5 is a diagram showing a trend of variation in pH with time in a leaching column during a simulated column leaching test.

A conceptual model of column leaching having the same physical parameters and rock mineral characteristics as in the actual situation was established based on the conditions of the laboratory pressure column leaching test. As shown in FIG. 4 and FIG. 5, an injection well was placed at the left end and a production well was placed at the right end. Main physical parameters were defined as shown in Table 1, with a leaching column length of 2.5 m and a leaching column diameter of 0.1 m. The left side was assumed as a prescribed flow boundary. The flow velocity was expressed by a pore volume (PV), i.e., a volume of pores in the test sample, and set to be about 1 PV per day. In addition, the initial volume fraction of uranium-bearing ore in the ore sample in the leaching column was 0.001 (vol. %), and the initial mass concentration of uranium in the aqueous solution was $6.3 \times 10^{-7}$ mol/kgw. The leaching solution containing carbon dioxide and oxygen was injected from the left boundary. The hydrochemical composition and other parameters during the test are shown in Table 2. The duration of the simulated process was 200 d, and time was discretized by automatic time stepping. The simulation involved such chemical components as $H_2O$, $Na^+$, $Ca^{2+}$, $Mg^{2+}$, $K^+$, $H^+$, $Cl^-$, $HCO_3^-$, $AlO_2^-$, $O_2$ (aq), $SiO_2$ (aq) and U (VI) and related aqueous complexes, and mineral components mainly including quartz, albite, K-feldspar, muscovite, dolomite, dolomite, calcite, and uraninite.

TABLE 1

| Major Physical Parameter of Conceptual Model in the Example of the Present Disclosure | | |
| --- | --- | --- |
| Parameter | Unit | Numerical Value |
| Length of Leaching column | m | 2.5 |
| Diameter | m | 0.1 |

TABLE 1-continued

Major Physical Parameter of Conceptual Model
in the Example of the Present Disclosure

| Parameter | Unit | Numerical Value |
|---|---|---|
| Effective porosity | — | 0.25 |
| Rock density | kg/m$^3$ | 2300 |
| Permeability | m$^2$ | $1.0 \times 10^{-13}$ |
| Longitudinal dispersivity | m | 0.5 |
| Temperature | $^\circ$ C. | 25 |

TABLE 2

Hydrochemical Composition in Column Leaching Test

| Component | Content (mol/kgw) |
|---|---|
| Temperature | 25$^\circ$ C. |
| PH | 7.62 |
| Ca$^{2+}$ | 0.000131 |
| Mg$^{2+}$ | 0.00014 |
| K$^+$ | 0.00051 |
| SiO$_2$(aq) | 0.00023 |
| HCO$_3^-$ | 0.041148 |
| AlO$_2^-$ | 0.000131 |
| Cl$^-$ | 0.003831 |
| O$_2$ (aq) | 0.000225 |

4) Network of Reactions During Pressure Column Leaching with $CO_2+O_2$

The primary mechanism of $CO_2+O_2$ in-situ leaching of uranium was as follows: a leaching solution prepared with $CO_2$ and $O_2$ was injected into an ore deposit, in which this chemical solution provides an oxidizing agent to oxidize reduced uranium ($UO_2$) to hexavalent uranium, and $CO_2$ was dissolved in water and reacted with carbonate rock to form bicarbonate $HCO_3^-$ to serve as a coordination ion for complexing of uranium and to regulate the pH of the system; and $HCO_3^-$ was complexed with uranium oxides in the ore bed to form uranyl carbonate. Thus, uranium was dissolved and leached, and then lifted to the ground for ion exchange recovered. $CO_2+O_2$ in-situ leaching of uranium involved such chemical reactions as complexation-dissociation, adsorption-desorption, oxidation-reduction, and dissolution-precipitation.

a) Complexation-Dissociation

Results of hydrochemical analysis on the leachate during the column leaching test showed a total concentration of each component present in different forms. Some components were almost all present in the form of simple ions, while numerous components were present in the form of complicated complex ion(s) or neutral conjugate(s). Under an oxidizing condition, the uranyl ion $UO_2^{2+}$ of hexavalent uranium U (VI) was thermally stable, and $UO_2^{2+}$ was highly prone to complexing with $CO_3^{2-}$ to form complexes including uranyl carbonate complexes $UO_2(CO_3)_2^{2-}$ and $UO_2((CO_3)_3)^{4-}$ as main component. The complexation usually resulted in improved dissolution of uranium and significantly enhanced migration of uranium. Equilibrium constants for complexing reactions of uranyl ion $UO_2^{2+}$ with other inorganic ligands were listed in Table 3.

TABLE 3

Equilibrium constants for Complexing Reactions of Uranyl Ion $UO_2^{2+}$ with Major Ligands (25$^\circ$ C.)

| Major Chemical Reaction | LogK(25$^\circ$ C.) |
|---|---|
| $UO_2^{2+} + H_2O = UO_2OH^+ + H^+$ | −5.20 |
| $UO_2^{2+} + 2H_2O = UO_2(OH)_{2,\,aq} + 2H^+$ | −11.50 |
| $UO_2^{2+} + 3H_2O = UO_2(OH)_3^- + 3H^+$ | −20.00 |
| $UO_2^{2+} + 4H_2O = UO_2(OH)_4^{2-} + 4H^+$ | −33 |
| $2UO_2^{2+} + H_2O = (UO_2)_2OH^{3+} + H^+$ | −2.70 |
| $2UO_2^{2+} + 2H_2O = (UO_2)_2(OH)_2^{2+} + 2H^+$ | −5.62 |
| $3UO_2^{2+} + 4H_2O = (UO_2)_3(OH)_4^{2+} + 4H^+$ | −11.90 |
| $3UO_2^{2+} + 5H_2O = (UO_2)_3(OH)_5^+ + 5H^+$ | −15.55 |
| $3UO_2^{2+} + 7H_2O = (UO_2)_3(OH)_7^- + 7H^+$ | −31.00 |
| $4UO_2^{2+} + 7H_2O = (UO_2)_4(OH)_7^+ + 7H^+$ | −21.9 |
| $UO_2^{2+} + CO_3^{2-} = UO_2CO_3(aq)$ | 9.67 |
| $UO_2^{2+} + 2CO_3^{2-} = UO_2(CO_3)_2^{2-}$ | 16.94 |
| $UO_2^{2+} + 3CO_3^{2-} = UO_2(CO_3)_3^{4-}$ | 21.60 |
| $UO_2^{2+} + 6CO_3^{2-} = UO_2(CO_3)_6^{6-}$ | 54 |
| $2UO_2^{2+} + CO_3^{2-} + 3H_2O = (UO_2)_2CO_3(OH)_3^- + 3H^+$ | −0.86 |
| $3UO_2^{2+} + CO_3^{2-} + 3H_2O = (UO_2)_3CO_3(OH)_3^+ + 3H^+$ | 0.66 | b) Adsorption-Desorption

During long-term water-rock interaction occurring between the leaching solution and the ore sample in the column leaching test, adsorption-desorption might control the migration of uranium in the leaching column, with accompanying minerals such as iron oxides, clay minerals and calcite in the ore sample serving as the adsorbent and the adsorption efficiency depending on the concentration of uranium, the concentration of a substance involved in competitive adsorption with uranium, and the adsorbability of the adsorbent. The amount of adsorption of uranium on a solid surface during adsorption-desorption was generally described by using an isothermal adsorption equation. Linear isothermal adsorption, Langmuir isothermal adsorption and Freundlich isothermal adsorption are common isothermal adsorption types.

c) Oxidation-Reduction

Oxidation-reduction could be closely related to the dissolution-precipitation of a mineral. For example, oxidative dissolution of uraninite ($UO_2$) was a multi-step reaction process. The leaching process of uranium ores with the leaching solution generally consisted of five steps: (1) diffusion of a leaching agent from the solution to the surfaces of ores; (2) adsorption of the leaching agent on the surface of the ores; (3) chemical reaction of the leaching agent adsorbed on the internal surface of the ores with the ores; (4) desorption of reaction products from the surface of the ores; and (5) separation of the products from the surface of the ores by diffusion. Most researchers believed that surface oxidation occurs based on the mechanism of electron transfer and adsorption of oxygen molecules on the surface of a matrix. The proposed mechanism of oxidative dissolution may be explained by the following processes:

$$>UO_2+O_2 \Rightarrow >UO_2-O_2kO_2$$

$$>UO_2-O_2+>UO_2 \Rightarrow 2>UO_3 \text{ Fast}$$

where $>UO_2$ denotes a surface reaction site; $>UO_2-O_2$ denotes a surface site with completely adsorbed oxygen molecules; and $>UO_3$ denotes a completely oxidized surface site.

d) Dissolution-Precipitation

In the system of $CO_2+O_2$ in-situ leaching of uranium, the injected $CO_2$ would cause the geochemical equilibrium state to change, resulting in dissolution of some minerals and precipitation of other minerals that were not present previously to form secondary minerals. For dissolution and precipitation of a mineral are controlled by thermodynamic equilibrium, the dissolved or precipitated state of the mineral might be identified by using a mineral saturation index (SI) expressed by the following formula:

$$SI = \log\frac{IAP}{K_{sp}}$$

where SI is the saturation index, IAP is an ion activity product, and $K_{sp}$ is a solubility product constant. If SI<0, unsaturation of the mineral was indicated; if SI=0, unsaturation of the mineral was indicated; and if SI>0, precipitation of the mineral was indicated.

The dissolution and precipitation of a mineral depending on reaction dynamics might be expressed by a mineral reaction rate. The composition of minerals involved in the model and the parameters for calculation of dynamic rates of mineral reactions are shown in Table 4.

regulating pH and oxidation-reduction potential Eh. A higher $E_h$ would maintain the dissolved state of uranium. A suitable pH would allow for effective complexing of uranyl ion with bicarbonate ($HCO_3^-$) for leaching, and secondary precipitation of carbonate minerals during leaching could be effectively inhibited by controlling the pH within a certain range. The results of the laboratory column leaching test also showed that the peak of uranium concentration appeared also with a higher addition amount of $O_2$, meaning that a sufficient amount of $O_2$ was crucial to the leaching effect of uranium.

To achieve accurate simulation and dynamic control of $CO_2+O_2$ leaching, the following control strategy was adopted.

(1) Due to the complex structure of the reactive solute transport model of the system of in-situ leaching of uranium and significant uncertainty of input parameters, the effects of several key parameters on the results of the model were quantized by parameter sensitivity analysis. Specifically, a

TABLE 4

| Parameters for Calculation of Dynamic Rates of Mineral Reaction | | | | |
|---|---|---|---|---|
| Mineral | Dissolution-precipitation reaction | $k_{25}$ (mol/m$^2$/s) | $\Pi a_i^n$ | $E_a$ |
| Quartz | $SiO_2(s) \leftrightarrow SiO_2(aq)$ | $10^{-13.99\ a}$ | 1.0 | 87.5 [a] |
| Albite | $NaAlSi_3O_8(s) \leftrightarrow Na^+ + AlO_2^- + 3SiO_2(aq)$ | $3.89 \times 10^{-13\ a}$ <br> $8.71 \times 10^{-11\ b}$ | $[H^+]^{0.5}$ | 38.0 [a] <br> 51.7 [b] |
| K-feldspar | $KAlSi_3O_8(s) \leftrightarrow K^+ + AlO_2^- + 3SiO_2(aq)$ | $3.89 \times 10^{-13\ a}$ <br> $8.71 \times 10^{-11\ b}$ | $[H^+]^{0.5}$ | 38.0 [a] <br> 51.7 [b] |
| Muscovite | $KAlSi_3O_{11} \bullet H_2O(s) \leftrightarrow 2H^+ + K^+ + 3AlO_2^- + 3SiO_2(aq)$ | $6.74 \times 10^{-13\ a}$ <br> $4.16 \times 10^{-13\ b}$ | $[H^+]^{0.37}$ | 62.76 [a b] |
| Dolomite | $CaMg(CO_3)_2(s) + 2H^+ \leftrightarrow Ca^{2+} + Mg^{2+} + 2HCO_3^-$ | $2.95 \times 10^{-8\ a}$ <br> $6.5 \times 10^{-4\ b}$ | $[H^+]^{0.5}$ | 52.2 [a] <br> 36.1 [b] |
| Ankerite | $CaMg_{0.3}Fe_{0.7}(CO_3)_2(s) + 2H^+ \leftrightarrow$ <br> $Ca^{2+} + 0.3Mg^{2+} + 0.7Fe^{2+} + 2HCO_3^-$ | $1.3 \times 10^{-9\ a}$ <br> $6.5 \times 10^{-4\ b}$ | $[H^+]^{0.5}$ | 62.76 [a] <br> 36.1 [b] |
| Calcite | $CaCO_3(s) + H^+ \leftrightarrow Ca^{2+} + HCO_3^-$ | $1.0 \times 10^{-4.82\ a}$ <br> $1.0 \times 10^{-1.08\ b}$ | $[H^+]$ | 62.76 [a b] |
| Uraninite | $UO_2(s) + 3HCO_3^- + 0.5O_2 \leftrightarrow H_2O + UO_2(CO_3)_3^{4-} + H^+$ | $1.0 \times 10^{-7.46\ b}$ <br> $3.15 \times 10^{-10\ b}$ | $[H^+]^{0.37} \times [O_2(aq)]^{0.31}$ <br> $[HCO_3^-]^{0.35\pm0.02}$ | 62.76 [a b] |

Notes:

superscripts [a] and [b] represent dissolution of a mineral under the action of a neutral mechanism (spontaneous) and dissolution under the action of an acid mechanism, respectively.

5) Result Analysis of Simulation of Reactive Transport During Leaching

Figure 6:
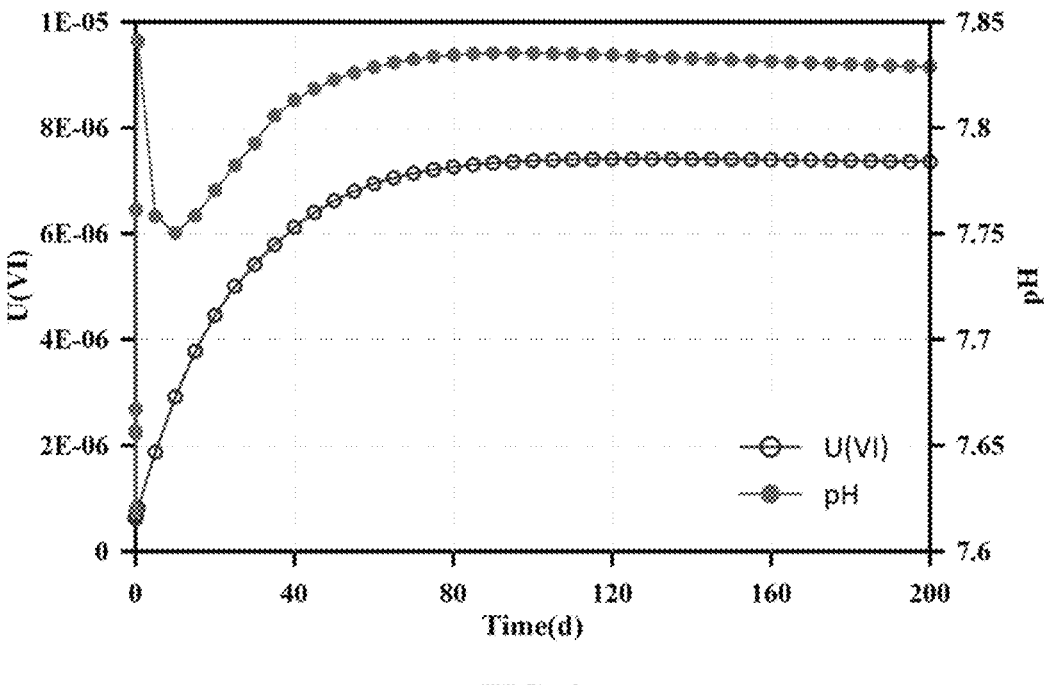
FIG. 6 is a diagram showing results of variation in dissolved uranium U (VI) and pH in leachate during a simulated column leaching test.
Figure 7:
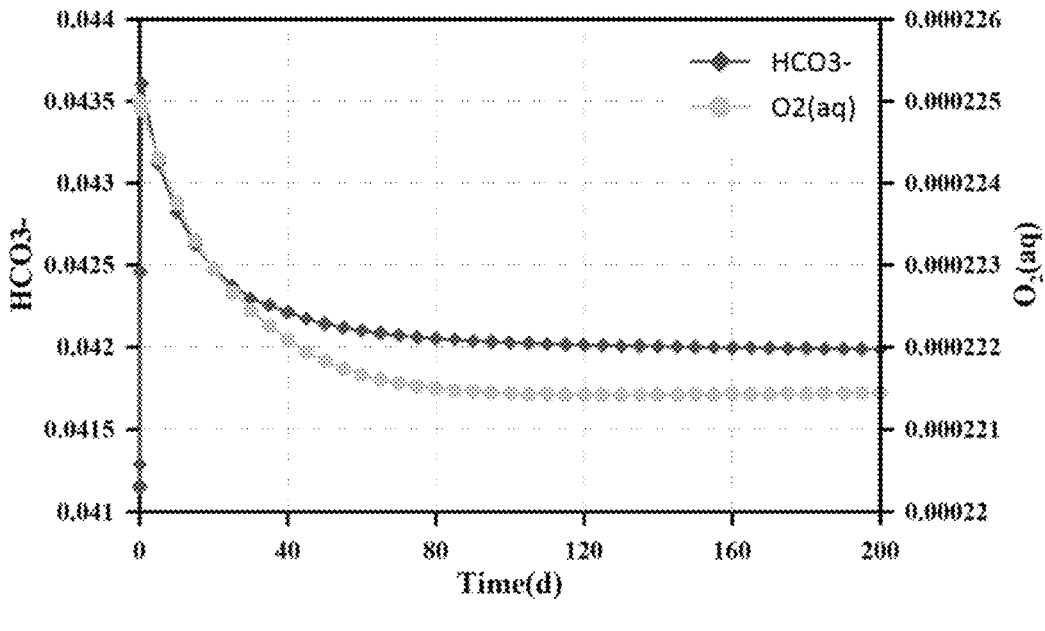
FIG. 7 is a diagram showing results of variation in concentrations of dissolved $O_2$ (aq) and $HCO_3^-$ in leachate during a simulated column leaching test.

FIG. 4 and FIG. 5 illustrate the trends of variation in mass concentration of uranium and pH in the leaching column with time during the simulated column leaching test, respectively, and FIG. 6 illustrates the results of variation in mass concentration of uranium and pH in the leachate during the simulated column leaching test. As shown in the figures, the mass concentration of uranium in the leachate increased constantly. The average mass concentration of uranium in the leachate on day 200 of leaching was 1.7 mg/mol, and in this case, uranium was not completely leached. Uranium was then continuously leached until no uranium was leached from the uraninite in the leaching column. The pH in the leaching column was 7.62 initially, and then changed slightly, but the overall pH would be within a range of 7.6-7.9. FIG. 7 illustrates the results of variation in concentrations of dissolved $O_2$ (aq) and $HCO_3^-$ in the leachate during the simulated column leaching test. As shown in the figure, the concentration of dissolved $O_2$ (aq) and $HCO_3^-$ decreased within a small range during leaching. This was contrary to the trend of variation in mass concentration of uranium mainly because dissolved $O_2$ (aq) and $HCO_3^-$ were depleted by the dissolution reactions of uranium and also reacted with other minerals, and further played a role in variation of ±10% was made to each of such key parameters as volume fraction of uranium ore, reaction specific surface area, dissolved oxygen concentration, bicarbonate concentration and dissolution rate constant in the reactive transport model on the basis of the corresponding parameter value obtained after model calibration, whereby key factors for the concentration of leached uranium were identified. To further analyze the reaction mechanism of in-situ leaching of urbanism and investigate which of dissolved oxygen concentration and dissolved carbon dioxide concentration had a greater influence on in-situ leaching of uranium, the sensitivity analysis on the influence of $CO_2$ would be performed with $O_2$ (aq) and without $O_2$ (aq). Major factors affecting the release and migration of uranium during in-situ leaching of uranium could be obtained preliminarily by combining the analysis results.

Figure 8:
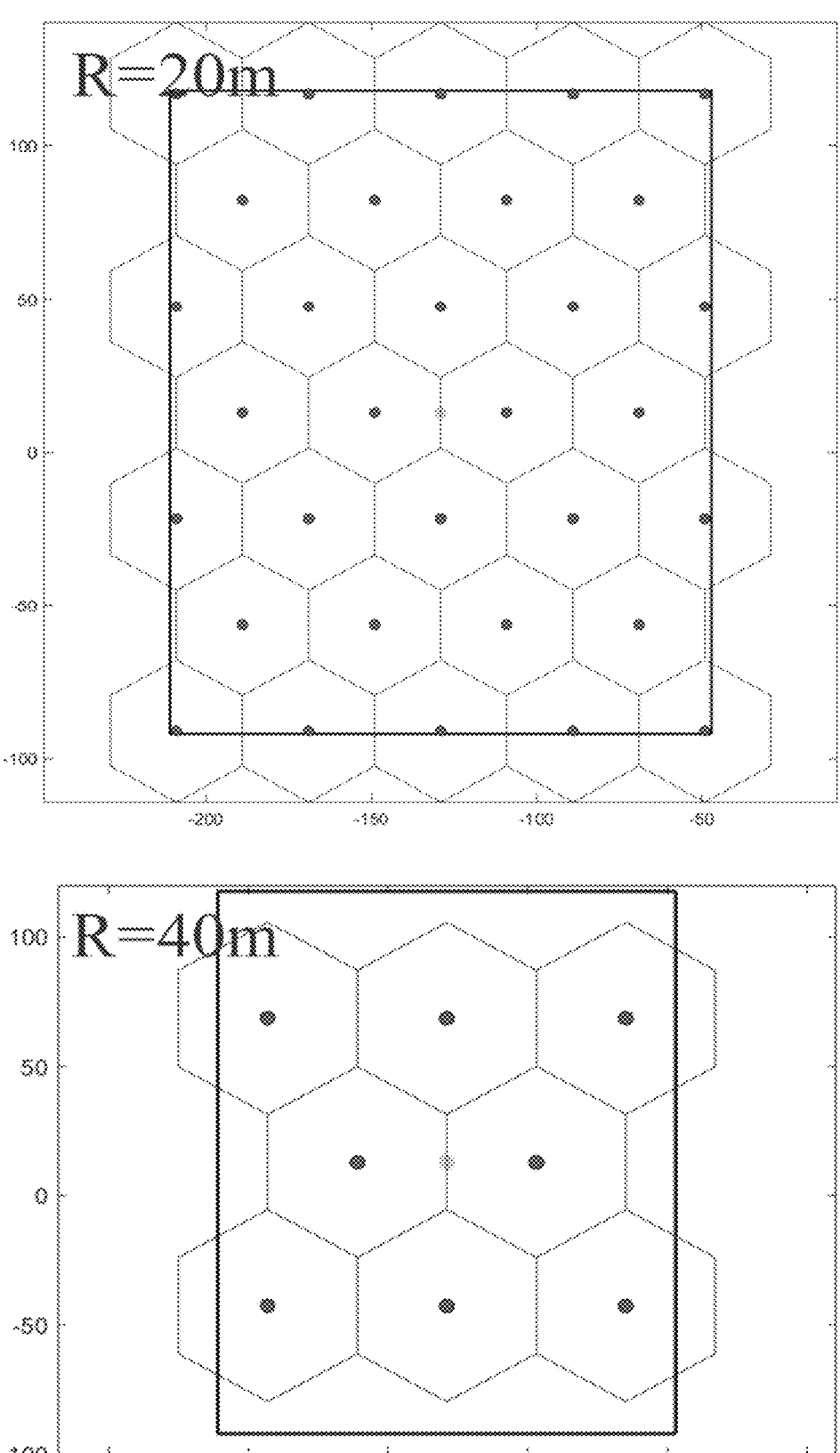
FIG. 8 is a schematic diagram of spatial distributions of production wells and injection wells at well spacing R=20 m and R=40 m.
Figure 9:
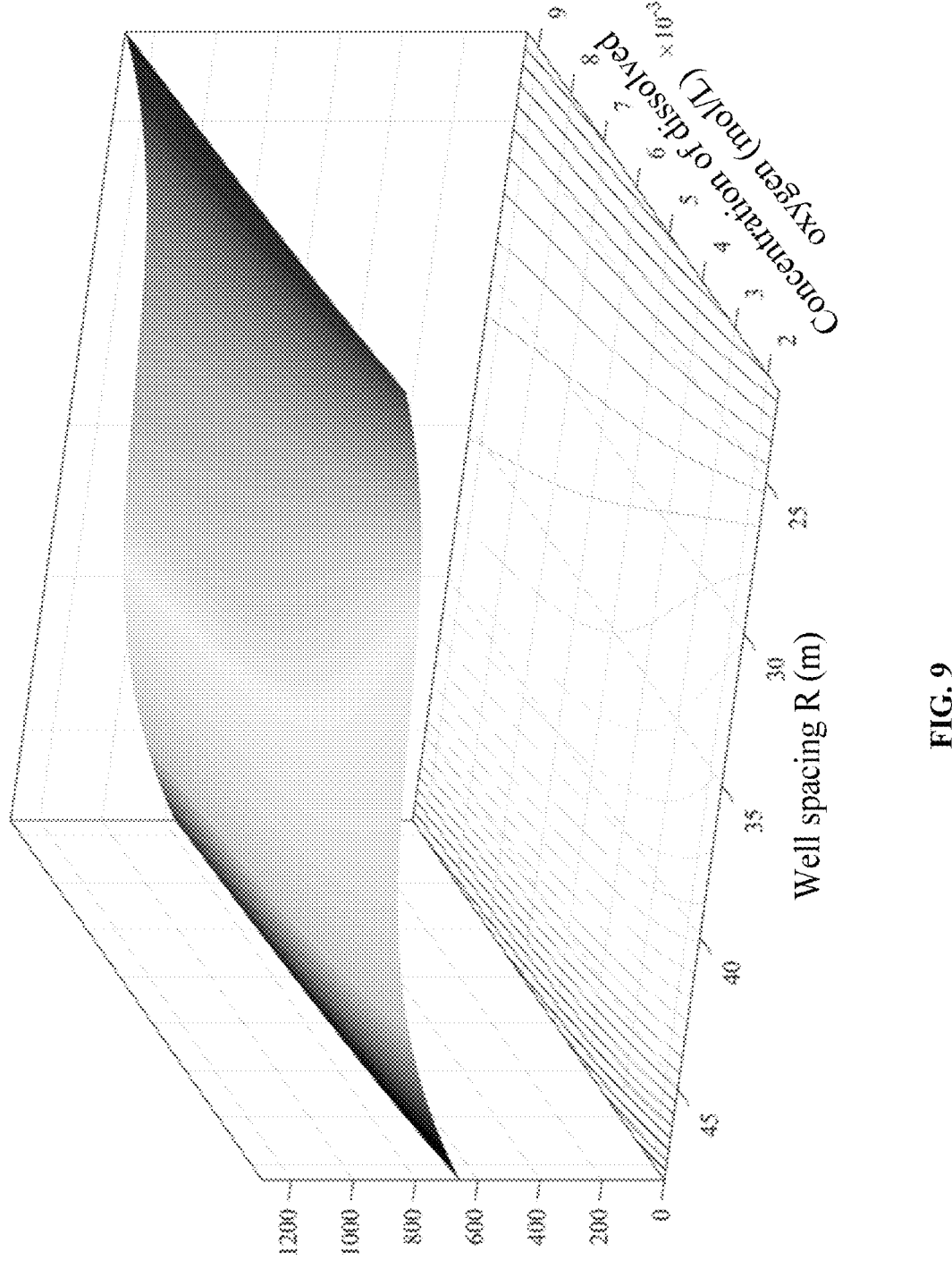
FIG. 9 is a schematic diagram of simulated cumulative concentrations of leached uranium with consideration of a combination of well spacing (R) and the concentration of injected $O_2$.

(2) Accurate simulation and dynamic control of $CO_2+O_2$ in-situ leaching of uranium could be discussed by the following process. Major influencing factors concerned during practical in-situ leaching of uranium included well spacing (R) between injection and production wells, volume of injected fluid, ($Q_{in}$), volume of pumped fluid ($Q_{out}$), concentration of dissolved 02 in leaching solution, etc. Taking a combination of well spacing (R) between injection and production wells and concentration of dissolved $O_2$ in leaching solution for example, the well spacing R was set to 10 m, 20 m, 30 m and 40 m and the concentration of dissolved $O_2$ to 0.002 mol/L, 0.004 mol/L, 0.06 mol/L and 0.08 mol/L, respectively. The relationship between the number of injection and production wells with well spacing of 20 m and 40 m were as shown in FIG. 8, with 18 production wells and 54 injection wells at R=20 m, and 4 production wells and 16 injection wells at R=40 m. One of values of well spacing (R) was combined with one of values of the concentration of dissolved 02. Cumulative concentrations of leached uranium were obtained based on the operation results of the established reactive transport model of in-situ leaching of uranium, and a diagram showing trends of cumulative concentrations of leached uranium simulated in case of different combinations was drawn, as shown in FIG. 9. As shown in the figure, cumulative concentrations of leached uranium increased with decreasing well spacing between injection and production wells and increasing concentration of dissolved $O_2$ in the leaching solution. The influence of a combination of other influencing factor on the cumulative concentration of leached uranium would be investigated similarly. Thus, a guidance can be provided on a practical project of in-situ leaching of uranium, and accurate simulation and dynamic control of $CO_2+O_2$ in-situ leaching of uranium can be achieved.

The foregoing are merely descriptions of the specific embodiments of the present disclosure, and the protection scope of the present disclosure is not limited thereto. Any modification or replacement made within the technical scope of the present disclosure by a person skilled in the art shall fall within the protection scope of the present disclosure. Therefore, the protection scope of the present disclosure should be subject to the protection scope of the claims.

What is claimed is:

1. A method for numerical simulation of reactive transport during $CO_2+O_2$ in-situ leaching of uranium at a sandstone-type uranium deposit, said method comprising the following steps:

(1) collecting basic data of a mining area of the sandstone-type uranium deposit, said basic data including relative plane positions of injection and production wells in the mining area, a distance between injection and production wells of the mining area, injection and production rates, groundwater level monitoring data, and hydrochemical analysis data of leaching solution and leachate;

(2) constructing a hydrodynamic model of $CO_2+O_2$ in-situ leaching of uranium based on the basic data collected in step (1) in combination with hydrogeological conditions of the mining area including the type, lithology and thickness of an ore-bearing aquifer, the depth of a groundwater level, the depth and thickness of an ore body, the condition of groundwater recharge based on the fundamental principle of conservation of mass and energy, and Darcy's law;

(3) determining initial conditions, boundary conditions, hydraulic parameters, and a source-sink term of the hydrodynamic model, and performing spatial mesh dissection and temporal discretization;

(4) solving the hydrodynamic model to obtain a distribution of temporal and spatial flow velocity vectors and a pressure distribution within a simulated domain;

(5) establishing a reactive solute transport model of $CO_2+O_2$ in-situ leaching of uranium based on the results of the hydrodynamic model in step (4) according to processes of component solute transport and chemical reactions in a system of in-situ leaching of uranium;

(6) determining a network of geochemical reactions and processes of equilibrium reactions and dynamic reactions of the reactive solute transport model;

(7) determining initial concentrations of simulated components in the reactive solute transport model, the composition of minerals involved in simulation, minerals produced by reactions and volume fractions thereof, and parameters for calculation of reaction dynamic rates of the minerals involved in simulation; and (8) solving the reactive solute transport model to obtain trends of variation in leaching concentration of dissolved uranium U (VI), pH and mineral content in the system of in-situ leaching of uranium, thereby completing the numerical simulation of reactive transport during $CO_2+O_2$ in-situ leaching of uranium.

2. The method for numerical simulation of reactive transport during $CO_2+O_2$ in-situ leaching of uranium at a sandstone-type uranium deposit according to claim 1, wherein the hydrodynamic model may be resolved by using a TOUGHREACT-V3/EOS9 module of a multi-component and multi-process reactive solute transport simulation program TOUGHREACT in step (4).

3. The method for numerical simulation of reactive transport during $CO_2+O_2$ in-situ leaching of uranium at a sandstone-type uranium deposit according to claim 1, wherein the reactive solute transport model of $CO_2+O_2$ in-situ leaching of uranium in step (5) is described by using the following mass conservation equation for chemical components:

$$\frac{\partial(\phi c_i)}{\partial t} = -\nabla(\rho c_i v) + \nabla(D_e \nabla c_i) + Q + \phi R \tag{1}$$

where the term on the left of the equation denotes a rate of mass change of chemical component i in a reaction system, and the term on the right denotes the contributions of convection and diffusion of the chemical component, a source-sink term, and dissolution and precipitation of mineral components to the mass change of the chemical component; $c_i$ is a concentration of the chemical component i involved in simulation in the reactive solute transport model, $D_e$ is an effective diffusion coefficient, Q is the source-sink term in the reaction system, R is a chemical reaction rate, $\phi$ is a porosity, $\rho$ is a fluid density, $v$ is a hydrodynamic velocity, and $\nabla$ is a gradient operator.

4. The method for numerical simulation of reactive transport during $CO_2+O_2$ in-situ leaching of uranium at a sandstone-type uranium deposit according to claim 1, wherein the determining a network of chemical reactions and processes of equilibrium reactions and dynamic reactions of the reactive solute transport model in step (6) comprises:

(a) determining chemical reactions during $CO_2+O_2$ in-situ leaching of uranium:

$$CO_2(aq)+H_2O=H^++HCO_3^- \tag{2}$$

$$2UO_2(s)+O_2=2UO_3(s) \tag{3}$$

$$UO_3(s)+2HCO_3^-=UO_2(CO_3)_2^{2-}+H_2 \tag{4}$$

$$UO_3(s)+CO_3^{2-}+2HCO_3^-=UO_2(CO_3)_3^{4-}+H_2O \tag{5}$$

US 12,559,821 B2

13

(b) creating a thermodynamic database of equilibrium reactions: adding the produced species of the dissolved uranium U (VI) and other components involved in simulation in the system of $CO_2+O_2$ in-situ leaching of uranium and corresponding equilibrium constant data to create a thermodynamic database of the $CO_2+O_2$ in-situ leaching of uranium for calculation of component forms of desired species and for use in numerical simulation of reactive solute transport; and (c) establishing a rate equation for dynamic reactions: determining a rate equation for reactions involved in dissolution and precipitation of minerals based on the transition state theory (TST) of chemical reactions.

5. The method for numerical simulation of reactive transport during $CO_2+O_2$ in-situ leaching of uranium at a sandstone-type uranium deposit according to claim 4, wherein the creating a thermodynamic database of equilibrium reactions comprises: defining an aqueous solution component and formed species in the system of in-situ leaching of uranium, determining a formation reaction process and a thermodynamic equilibrium constant of the formed species, forming a data combination with the component, the formed species and thermodynamic equilibrium constant, and creating thermodynamic database of equilibrium reactions with data combinations of a plurality of components in the reactive solute transport model.

6. The method for numerical simulation of reactive transport during $CO_2+O_2$ in-situ leaching of uranium at a sandstone-type uranium deposit according to claim 4, wherein the establishing a rate equation for dynamic reactions comprises: using the following reaction rate expression in the TOUGHREACT program:

$$r = kA\left|1 - \left(\frac{Q}{K}\right)^{\theta}\right|^{\eta} \tag{6}$$

where r is a dissolution/precipitation reaction rate of a mineral ($mol/m^3{\cdot}s$), k is a rate constant, ($mol/m^2{\cdot}s$), A is a specific surface area of a mineral per kilogram of water ($cm^2/g$); K is a chemical equilibrium constant, Q is an activity product of an ion, and $\theta$ and $\eta$ are constants measured through experiments, which are positive values.

7. The method for numerical simulation of reactive transport during $CO_2+O_2$ in-situ leaching of uranium at a sandstone-type uranium deposit according to claim 6, wherein for the dynamic reaction process of uraninite in a sandstone-type uranium deposit, the rate constant k at temperature of 25° C. is expressed as:

$$k=k_1[H^+]^{0.37}[O_2(aq)]^{0.31}+k_2[HCO_3^-]^{0.35} \tag{8}$$

where k is the rate constant ($mol/m2{\cdot}s$), and $k_1$ and $k_2$ are rate constants ($mol/m^2{\cdot}s$) with consideration of oxygen component $O_2$ (aq) and with consideration of bicarbonate ion ($HCO_3^-$), respectively, wherein 0.37, 0.31 and 0.35 are exponential terms of concentrations of chemical components $H^+$, $O_2$ (aq) and $HCO_3$.

8. The method for numerical simulation of reactive transport during $CO_2+O_2$ in-situ leaching of uranium at a sandstone-type uranium deposit according to claim 5, wherein the establishing a rate equation for dynamic reactions comprises: using the following reaction rate expression in the TOUGHREACT program:

$$r = kA\left|1 - \left(\frac{Q}{K}\right)^{\theta}\right|^{\eta} \tag{6}$$

where r is a dissolution/precipitation reaction rate of a mineral ($mol/m^3{\cdot}s$), k is a rate constant, ($mol/m^2{\cdot}s$), A is a specific surface area of a mineral per kilogram of water($cm^2/g$); K is a chemical equilibrium constant, Q is an activity product of an ion, and $\theta$ and $\eta$ are constants measured through experiments, which are positive values.

9. The method for numerical simulation of reactive transport during $CO_2+O_2$ in-situ leaching of uranium at a sandstone-type uranium deposit according to claim 8, wherein for the dynamic reaction process of uraninite in a sandstone-type uranium deposit, the rate constant k at temperature of 25° C. is expressed as:

$$k=k_1[H^+]^{0.37}[O_2(aq)]^{0.31}+k_2[HCO_3^-]^{0.35} \tag{8}$$

where k is the rate constant ($mol/m2{\cdot}s$), and $k_1$ and $k_2$ are rate constants ($mol/m^2{\cdot}s$) with consideration of oxygen component $O_2$ (aq) and with consideration of bicarbonate ion ($HCO_3^-$), respectively, wherein 0.37, 0.31 and 0.35 are exponential terms of concentrations of chemical components $H^+$, $O_2$ (aq) and $HCO_3^-$.

10. The method for numerical simulation of reactive transport during $CO_2+O_2$ in-situ leaching of uranium at a sandstone-type uranium deposit according to claim 1, wherein the reactive solute transport model in step (8) is resolved by using a sequential iteration algorithm (SIA) in the multi-component multi-process reactive solute transport simulation program TOUGHREACT.

*   *   *   *   *